(12) United States Patent
Alexander et al.

(10) Patent No.: US 8,366,085 B2
(45) Date of Patent: Feb. 5, 2013

(54) PIN LOCATING ASSEMBLY

(75) Inventors: Clinton L. Alexander, Fort Wayne, IN (US); Parag Patwardhan, Pune (IN); Bruce D. McIntosh, Monroeville, IN (US)

(73) Assignee: PHD, Inc., Fort Wayne, IN (US)

( * ) Notice: Subject to any disclaimer, the term of this patent is extended or adjusted under 35 U.S.C. 154(b) by 1077 days.

(21) Appl. No.: 12/142,431

(22) Filed: Jun. 19, 2008

(65) Prior Publication Data

US 2008/0315477 A1    Dec. 25, 2008

Related U.S. Application Data

(60) Provisional application No. 60/944,999, filed on Jun. 19, 2007.

(51) Int. Cl.
    *B23Q 3/08* (2006.01)
(52) U.S. Cl. ............................. 269/32; 269/20
(58) Field of Classification Search .......... 269/20, 269/32
    See application file for complete search history.

(56) References Cited

U.S. PATENT DOCUMENTS

| | | | |
|---|---|---|---|
| 3,135,171 A * | 6/1964 | Michalak, Jr. ............ | 92/14 |
| 3,320,861 A * | 5/1967 | Johnson et al. .......... | 92/14 |
| 3,802,297 A | 4/1974 | Schiler | |
| 3,812,766 A * | 5/1974 | Weiss ................. | 92/14 |
| 4,786,062 A | 11/1988 | Schneider | |
| 4,921,233 A | 5/1990 | Fabrice | |
| 5,791,230 A * | 8/1998 | Goellner ............ | 92/19 |
| 5,819,783 A | 10/1998 | Blatt et al. | |
| 6,557,841 B2 | 5/2003 | Dellach et al. | |
| 6,616,133 B1 | 9/2003 | Wheeler et al. | |
| 6,755,406 B2 | 6/2004 | Rentz et al. | |
| 6,880,816 B1 | 4/2005 | Wheeler et al. | |
| 6,913,254 B2 | 7/2005 | Pavlik et al. | |
| 6,931,980 B1 | 8/2005 | Zajac, Jr. et al. | |
| 7,029,000 B2 | 4/2006 | Petit et al. | |
| 7,448,607 B2 | 11/2008 | Steele et al. | |
| 7,467,788 B2 | 12/2008 | McIntosh et al. | |
| 7,516,948 B2 | 4/2009 | McIntosh et al. | |
| 8,132,798 B2 | 3/2012 | McIntosh et al. | |
| 8,132,799 B2 | 3/2012 | McIntosh et al. | |
| 2001/0013164 A1 | 8/2001 | Morel et al. | |
| 2002/0073838 A1 | 6/2002 | Sawdon | |
| 2002/0149147 A1 | 10/2002 | Schauss | |
| 2002/0195761 A1 | 12/2002 | Dellach et al. | |
| 2003/0052293 A1 | 3/2003 | Enzaki et al. | |
| 2004/0041323 A1 | 3/2004 | Migliori | |
| 2004/0061268 A1 | 4/2004 | Sawdon | |
| 2004/0070130 A1 | 4/2004 | Pavlik et al. | |
| 2004/0113342 A1 | 6/2004 | Tunkers | |
| 2005/0126865 A1 | 6/2005 | Sato et al. | |
| 2005/0225018 A1 | 10/2005 | Tunkers | |
| 2005/0269755 A1 | 12/2005 | Zhao et al. | |
| 2006/0130645 A1 | 6/2006 | McCrary | |

(Continued)

FOREIGN PATENT DOCUMENTS

| | | |
|---|---|---|
| DE | 20317401 U1 | 3/2004 |
| DE | 2004003982 U1 | 7/2004 |

*Primary Examiner* — Lee D Wilson
*Assistant Examiner* — Shantese McDonald
(74) *Attorney, Agent, or Firm* — Taylor IP, P.C.

(57) ABSTRACT

A locating pin assembly is provided. The assembly includes a body and a cylinder assembly for moving a ram in a reciprocally linear manner. A bearing is coupled to the ram and configured to engage a bearing wedge to reduce "play" between the ram and the assembly. Illustratively, the bearing and bearing wedge reduce or substantially eliminate this "play" to prevent axial rotation of the ram.

15 Claims, 7 Drawing Sheets

U.S. PATENT DOCUMENTS

| | | |
|---|---|---|
| 2007/0042632 A1 | 2/2007 | Patwardhan et al. |
| 2007/0267795 A1 | 11/2007 | Patwardhan et al. |
| 2008/0315477 A1 | 12/2008 | Alexander et al. |
| 2008/0315478 A1 | 12/2008 | McIntosh |
| 2009/0096146 A1 | 4/2009 | Steele et al. |
| 2009/0315236 A1 | 12/2009 | McIntosh |

* cited by examiner

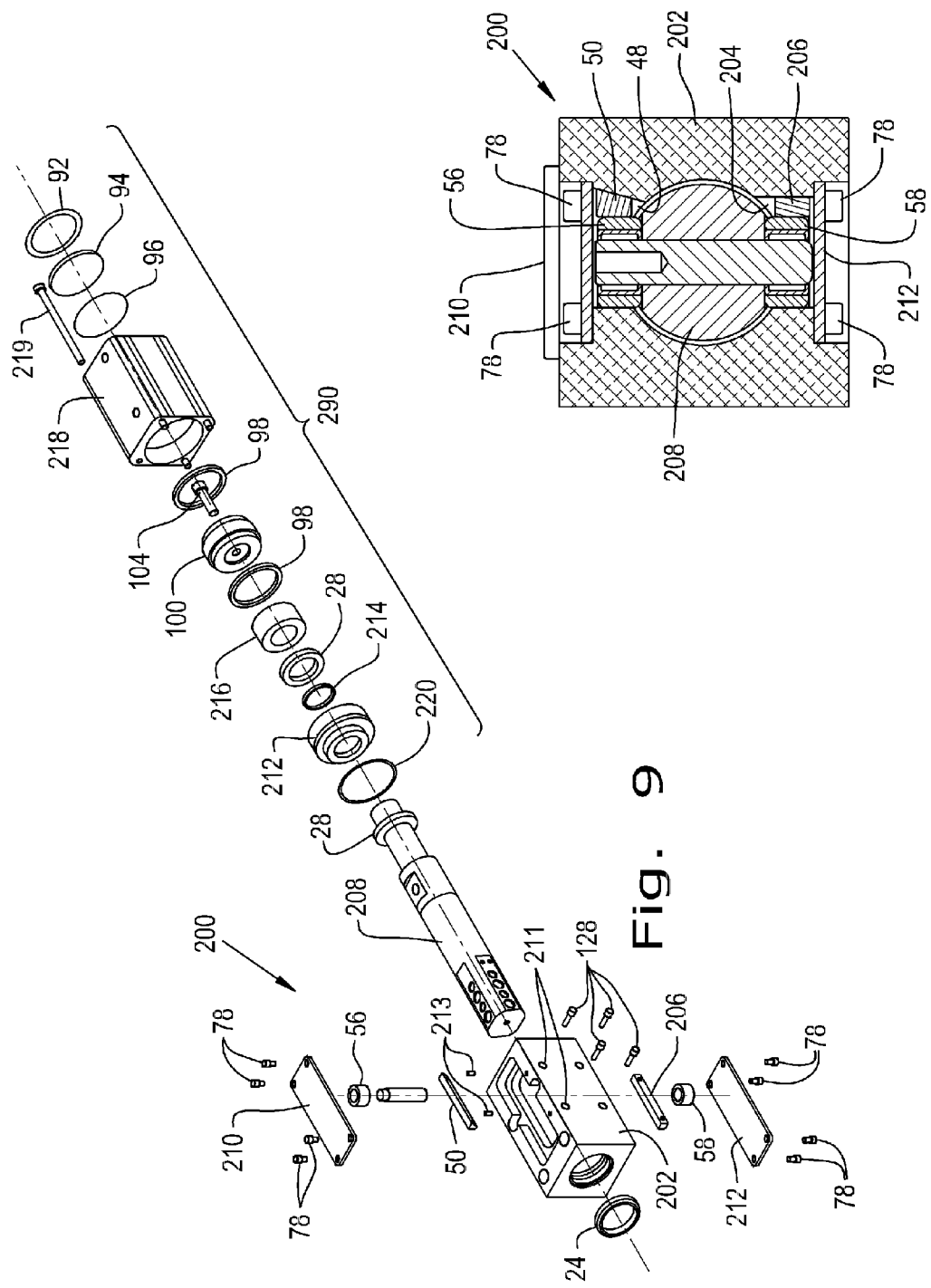

PIN LOCATING ASSEMBLY

RELATED APPLICATIONS

The present application is related to and claims priority to U.S. Provisional Patent Application, Ser. No. 60/944,999, filed on Jun. 19, 2007, entitled Pin Locating Assembly. The subject matter disclosed in that provisional application is hereby expressly incorporated into the present application.

TECHNICAL FIELD

The present disclosure is related to locating pin or shot pin assemblies.

BACKGROUND AND SUMMARY

A problem with shot pin assemblies is the flex or "play" between the assembly's ram and housing.

An illustrative embodiment of a locating pin assembly disclosed herein comprises a body that includes a cylinder assembly for moving a ram in a reciprocally-linear manner. An embodiment of the assembly further includes a bearing coupled to the ram configured to engage a bearing wedge to reduce the "play" between the ram and internal components of the assembly. Illustratively, the bearing and bearing wedge reduce or substantially eliminate this "play" preventing axial rotation of the ram.

Another illustrative embodiment of the locating pin assembly comprises a body, a ram, a bearing wedge, and a bearing. The body includes a cavity having a first surface. The ram is partially disposed in the cavity of the body and extends outward therefrom. The ram is also movable with respect to the body between extended and retracted positions. The bearing wedge is located on the first surface of the wedge. The bearing is attached to the ram which engages the bearing wedge to limit axial rotation of the ram.

In the above and other embodiments, the pin locating assembly may further comprise: a second surface in the body that receives a second bearing wedge; a second bearing attached to the ram which engages the second bearing wedge; the second bearing being located on an opposite side of the ram from the bearing; a stop that is attached to the ram that limits the movement of the ram; at least a portion of the stop being made of a resilient material; a second stop attached to the ram opposite the stop; the stop being adjustable relative to the ram; the stop including a key, and the ram a corresponding key slot to receive the key; the ram including a plurality of key slots; a weld-splatter cover positioned around a portion of the ram; a sensor target coupled to the ram and a sensor spaced apart from the sensor target which is movable relative to the sensor; an actuator that moves the ram; the bearing being roller bearing; and the second bearing being a second roller bearing.

In another illustrative embodiment, the ram may include bearings located on opposite sides of the ram oriented generally perpendicular to the longitudinal extent of the ram. Each bearing may engage a bearing wedge so that axial rotation of the ram about its longitudinal extent can be controlled, limited, and/or eliminated regardless whether that rotational force is exerted clockwise or counter-clockwise with respect to the ram's longitudinal extent. In yet another embodiment, the bearing wedge may have an angled surface (such as 15°) that engages a corresponding angled surface on the body to "wedge" the bearing wedge between a roller bearing attached to the ram and the body. In a further embodiment, ram screws can be used to act on the bearing wedge pushing against it to further wedge it between the roller bearing and the body. It is appreciated that a plurality of these roller bearing/wedge bearing assemblies can be employed.

In still another embodiment, the locating pin assembly may be configured to extend at least partially into, and at least partially out of the body using a cylinder assembly that extends and retracts the ram. The amount of extension or retraction of the ram, i.e., its "stroke," can be assisted via at least one stop member coupled to the ram. In one illustrative embodiment, the ram may include a slot, cavity, or other receptacle that receives a "key" portion of the stop member. It is further contemplated in other embodiments that there may be a plurality of these receptacles on the ram to affect the length of the stroke. The stop member attaches to the ram by fitting into a key or cavity and engaging a fastener. The portion of the ram that receives the stop may be located in a body that includes an impact surface engageable with at least a portion of the stop to limit movement of the ram. In an illustrative embodiment, the stop may be configured to engage the surface to limit the extension of the ram exterior of the body. Additional embodiments may include the stop having a resilient tip, such as a urethane or other resilient material; the ram may include a stop member on axially opposed sides of the ram perpendicular to its longitudinal extent; a shot pin located in the body to limit the retraction portion of the ram's stroke; and a sensor target may be attached to a location on the ram, such as the stop for detection by a sensor assembly. Illustrative embodiments of the body may include side openings that allow access to the bearings and stops. Covers may be included that are removable via fasteners or other suitable means to gain selective access to the aforementioned sections of the ram.

Additional features and advantages of the shot pin or pin locating assembly will become apparent to those skilled in the art upon consideration of the following detailed description of the illustrated embodiment exemplifying the best mode of carrying out the shot pin or pin locating assembly as presently perceived.

BRIEF DESCRIPTION OF DRAWINGS

The present disclosure will be described hereafter with reference to the attached drawings which are given as non-limiting examples only, in which:

FIG. 4 is a side cross-sectional view of the pin locating assembly taken along lines B-B of FIG. 3a;

FIG. 9 is an exploded view of another illustrative embodiment of a pin locating assembly; and FIG. 10 is a forward-looking cross-sectional view of the pin locating assembly of FIG. 9.

Figure 1:
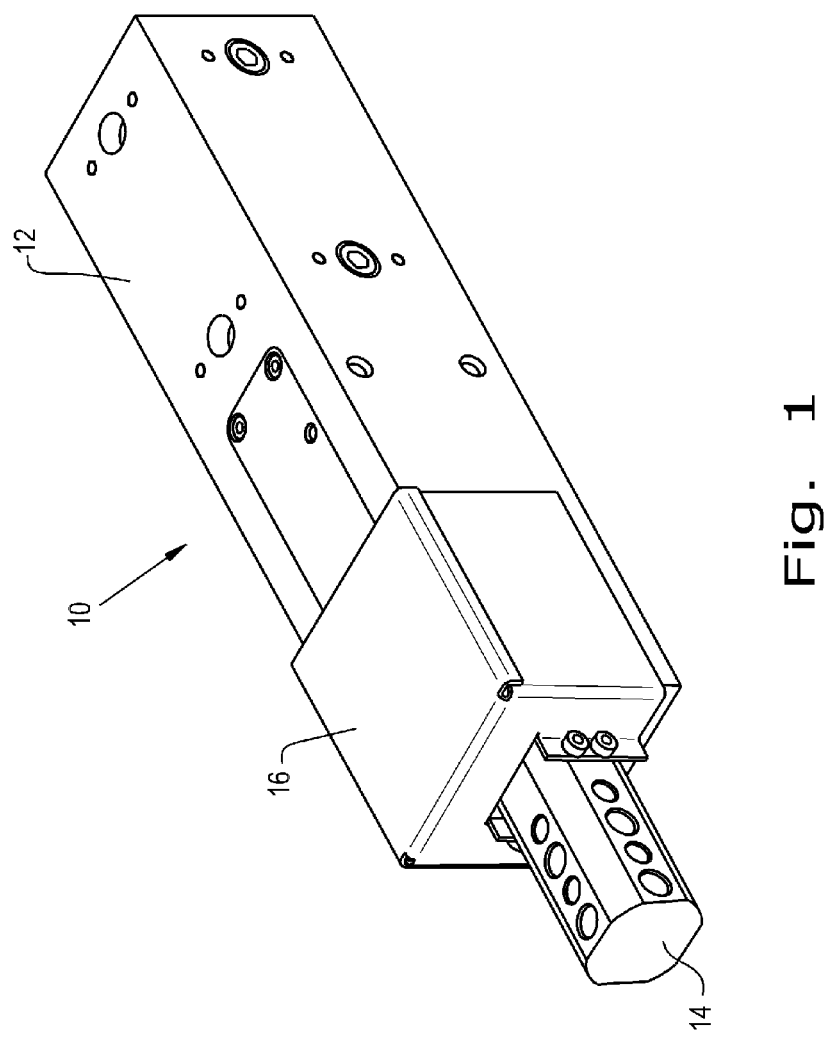
FIG. 1 is a perspective view of an illustrative embodiment of a shot pin or pin locating assembly.

Corresponding reference characters indicate corresponding parts throughout the several views. The exemplification set out herein illustrates embodiments of the shot pin or pin locating assembly, and such exemplification is not to be construed as limiting the scope of the shot pin or pin locating assembly in any manner.

DETAILED DESCRIPTION OF THE DRAWINGS

A perspective view of pin clamp 10 is shown in FIG. 1. Assembly 10 includes a body 12 with a ram 14 extending therefrom. A weld cover 16 attaches to and shrouds a portion of ram 14 as it extends and retracts from body 12 to protect the ram and body from weld splatter and other contaminants.

Figure 2:
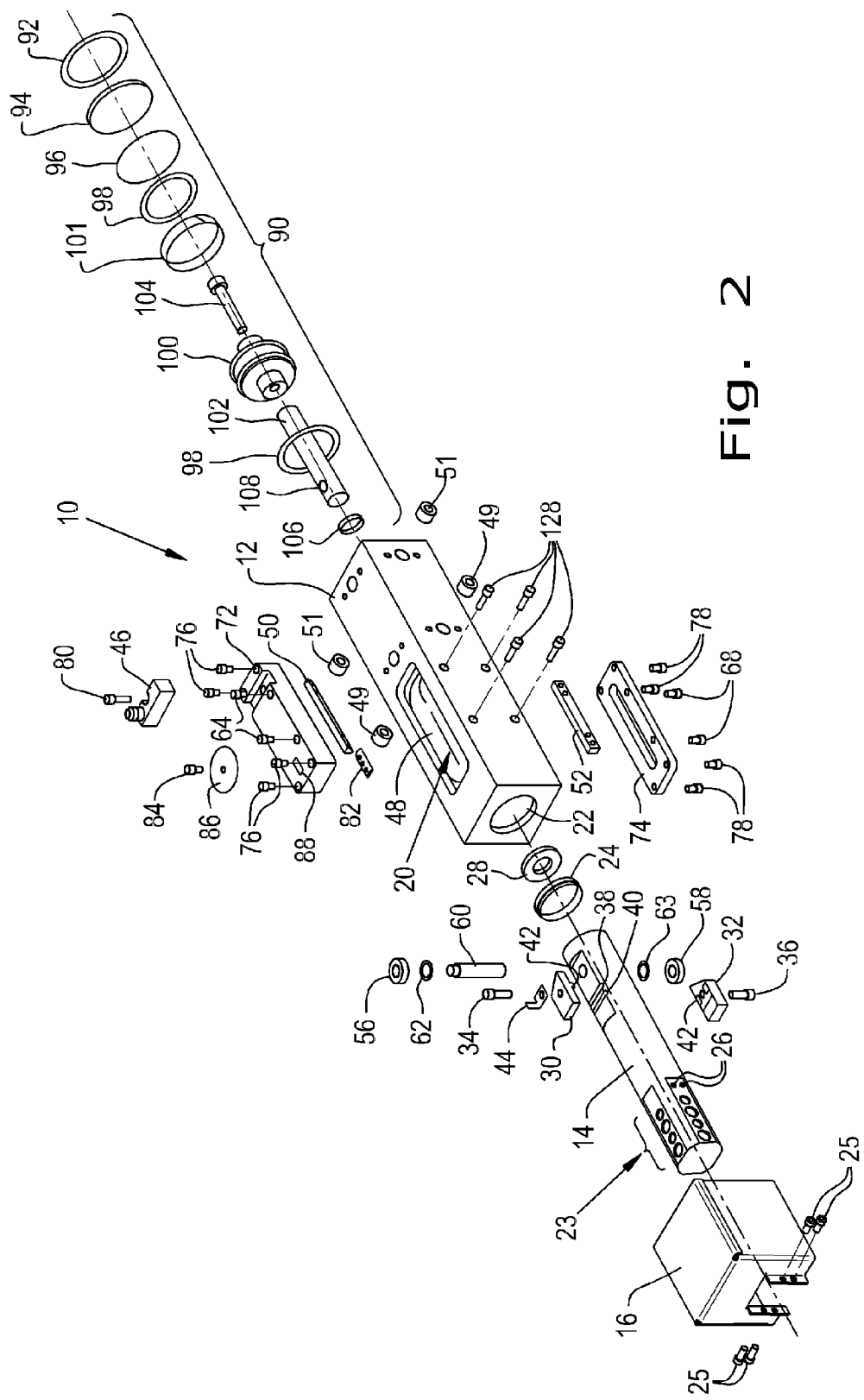
FIG. 2 is an exploded view of the pin locating assembly of FIG. 1.

An exploded view of assembly 10 is shown in FIG. 2. This view also shows body 12, ram 14, and weld cover 16 in addition to several other structures that compose the illustrative embodiment of assembly 10. For example, body 12 includes a cavity 20 and opening 22 that receives ram 14. A wiper 24 is disposed about the periphery of ram 14 and edge of opening 22 to keep contaminants out and lubricating material in body 12. Fasteners 25 illustratively attach the weld cover to ram 14 at 26. A shock pad 28 sits in cavity 20 to limit the length of retraction of ram 14. In an illustrative embodiment, stops 30 and 32 are attached to ram 14 via fasteners 34 and 36. To maintain consistency in placement of stops 30 and 32, each side of ram 14 illustratively includes key slots 38 and 40. Each of stops 30 and 32 has a key 42 that engages either slots 38 and 40. Because the stops can define the end of the stroke of ram 14, the length of the stroke can be affected by the particular slot used. A sensor target 44 may also be attached to one of the stops to be detected by sensor assembly 46.

In an illustrative embodiment, cavity 20 includes angled surfaces 48 (see, also, FIG. 6) that receive a corresponding angled surface of bearing wedges 50 and 52. These bearing wedges can provide a bearing surface for bearings 56 and 58 that are coupled to ram 14 via dowel 60 and, illustratively, washer 62 and 63. Bearings 56 and 58 are illustratively roller bearings that can roll or otherwise move along the surfaces of bearing wedges 50 and 52, respectively. These wedges are placed against angled surfaces 48 to eliminate any undesirable "play" that may exist between body 12 and ram 14. Bearings 56 and 58 may, in fact, be preloaded by wedges 50 and 52 when using jam screws 64 and 68, respectively. These jam screws push against bearing wedges 50 and 52 to "wedge" themselves between angled surfaces 48 of cavity 20 and bearings 56 and 58. This can be done to produce an optimum amount of tolerance which prevents twisting of the ram 14. (See also FIG. 6.) Illustrative port plugs 49 and 51 couple to body 16 for providing fluid to an actuator.

In illustrative embodiments, cavity 20 can be accessed via cover plates 72 and 74 which are attached to body 12 via fasteners 76 and 78, respectively. Sensor assembly 46 may be attached to cover 72 via fastener 80 and may include sensors that couple to switch bar 82 which is attached to fastener 84 which is disposed through cover 86 and through slot 88. To power ram 14, an illustrative embodiment of assembly 10 includes cylinder assembly 90 which includes a retaining ring 92, plug 94, and o-ring 96, a piston seal 98 as disposed about piston 100 as is wear ring 101 and another piston seal 98. Piston 100 is attached to piston rod 102 via fastener 104. A rod seal 106 is disposed about piston rod 102. In an illustrative embodiment, an opening 108 is disposed through piston rod 102 and receives dowel 60 that attaches piston rod 102 to ram 14. Thus, as fluid is disposed on one side of piston 100 or the other, movement of that piston makes ram 14 move. In another illustrative embodiment, opening 108 may be slotted to possibly create a "rap" effect on ram 14. (See, also, FIG. 4.) The slot allows movement of the piston rod to move prior to moving the ram. This allows piston rod 102 to exert an impact force or "pop" on rod 14. This impact force may assist in helping various attachments (not shown) that would attach to bores 23 on ram 14 to loosen the attachments from a workpiece.

Figure 3A:
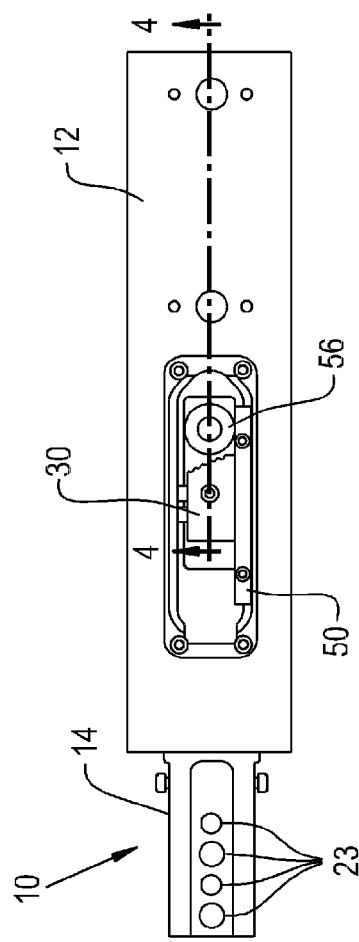
FIGS. 3a and b are top views of the pin locating assembly of FIG. 2, showing a ram located in a retracted and extended positions as well as showing the interior of the assembly.
Figure 3B:
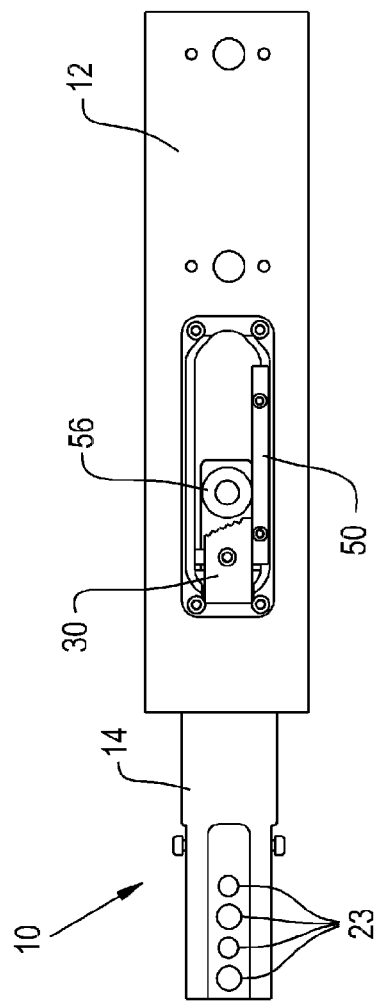
Figure 4:
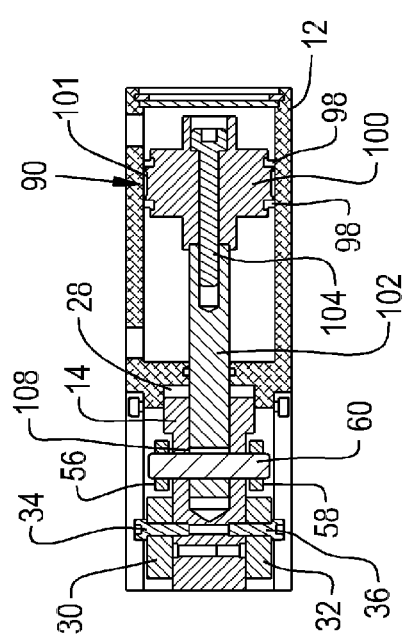

Top views of assembly 10, located in the retracted and extended positions, are shown in FIGS. 3a and b along with a side cross-sectional view of a portion of assembly 10 shown in FIG. 4. The view shown in FIG. 3a of clamp assembly 10 includes ram 14 located in the retracted position. This view shows how roller bearing 56 can roll against a surface of bearing wedge (or gib) 50. Similarly, the extended view shown in FIG. 3b depicts roller bearing 56 traveling along bearing wedge 50. This view also shows a utility of stop 30. Attaching stop 30 to ram 14 can limit its stroke by engaging a predetermined section of the body. It is appreciated that in illustrative embodiments, stop 30 may comprise a urethane tip or other resilient material at the end thereof to absorb impact forces when stops 30 or 32 impact body 12. It is appreciated that in further embodiments the stop can impact other structures that can limit the stroke of ram 14. The cross-sectional view shown in FIG. 4 shows the end of the stroke when ram 14 is retracted. In this case, ram 14 engages shock pad 28 at the end of the stroke. This view also shows, illustratively, how cylinder assembly 90 is assembled and used with ram 14. Further shown in this view is opening 108 as a slot that allows a "rap" force by piston rod 102 against dowel 60 which attaches ram 14 to piston rod 102.

Figure 5:
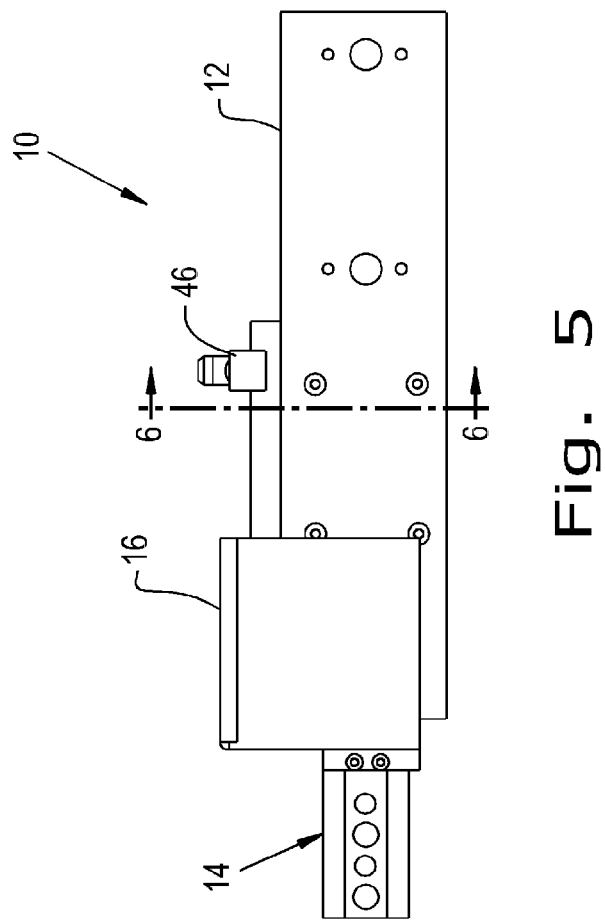
FIG. 5 is a side view of the pin locating assembly of FIG. 2.
Figure 6:
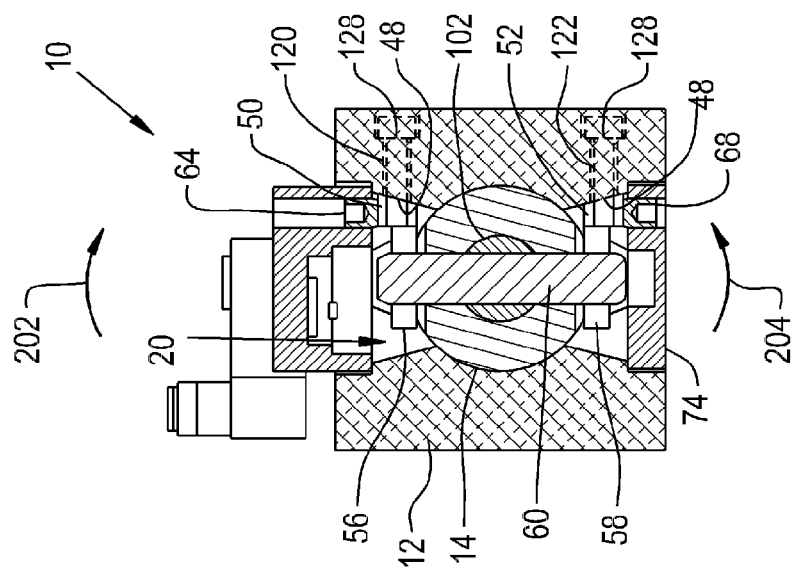
FIG. 6 is a forward-looking cross-sectional view of the pin locating assembly taken along the lines A-A of FIG. 5.

Side and front cross-sectional views are shown in FIGS. 5 and 6, respectively. The views shown in FIG. 6 demonstrate how bearing wedges 50 and 52 can be used to reduce the tolerance between body 12 and bearings 56 and 58. As shown in this illustrative embodiment, jam screws 64 and 68 engage bearing wedges 50 and 52 respectively. By pushing against these wedges, they are forced against bearings 56 and 58, respectively, which may preload the bearings. As a result, there is no or little "play" between the rollers and the bearing surfaces. This prevents ram 14 from rotating when torque is applied. For example, if a clockwise rotational force is exerted against ram 14, as indicated by directional arrow 202, the wedging between bearing wedge 50 and bearing 56 prevents movement. Similarly, if a counter-clockwise rotational force is exerted against ram 14, as indicated by directional arrow 204, wedge 52 and bearing 58 will receive that force and prevent ram 14 from moving. In an illustrative embodiment, the bores 120 and 122 are slotted so that fasteners 128 only threadably couple to bearing wedges 50 and 52, once jam screws 64 and 68 position bearing wedges in the desired location. In one embodiment, after the jam screws have positioned the bearing wedges, and the fasteners attached the bearing wedges to body 12, the jam screws may be removed, since the wedge screws will hold the bearing wedges in place.

The side view shown in FIG. 5 shows how weld cover 16 attaches to ram 14. Weld cover 16 illustratively moves with ram 14 to as it extends and retracts from body 12 to protect the ram and body from weld splatter and other contaminants.

Figure 7B:
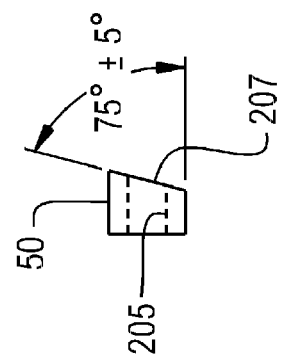
FIGS. 7a and b are face and end views of the bearing wedge portion of the pin locating assembly.
Figure 7A:
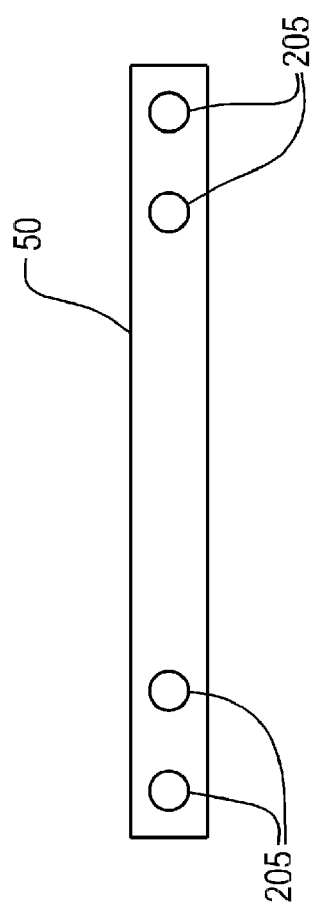

The FIGS. 7a and b are face and end views of the bearing wedge 50 (or 52). Illustratively, bores 205 receive fasteners 128 (see, also, FIG. 2). It is appreciated that in an illustrative embodiment, a plurality of bores 205 can be disposed through wedge 50(or 52) to allow the same to be adjustable with respect to the distance ram 14 travels. The end view of FIG. 7b show the illustrative angled surface 207 of wedge 50 (or 52). This angle can be illustratively about 75 degrees.

Figure 8C:
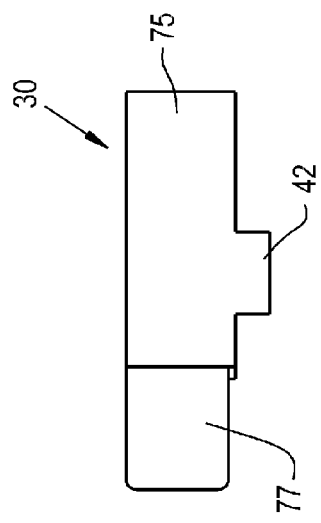
FIGS. 8a, b and c are perspective, side, and top views, respectively, of the stop portion of the pin locating assembly.
Figure 8B:
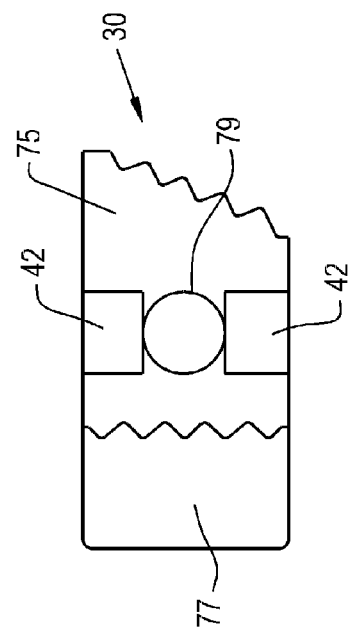
Figure 8A:
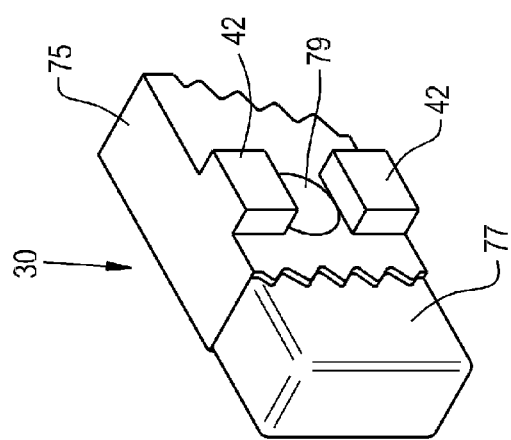

Several views of stop 30 (or 32) are shown in FIGS. 8a through c. In an illustrative embodiment, the stop may include a rigid portion 75 and a resilient portion 77. The resilient portion can be made from urethane or like material. Keys 42 illustratively protrude from rigid portion 75 and are configured to insert into key slots 38 and 40 on ram 14. A bore 79 is also disposed through rigid portion 75 to receive fastener 34 (see, also, FIG. 2).

An exploded view of another embodiment of a pin locating assembly 200 is shown in FIGS. 9 and 10. Many of the components in this embodiment are the same as in pin locating assembly 1 shown in FIG. 2. A distinction, however, is that housing 202 in assembly 200 includes only one angled surface 48, as shown in FIG. 10. The other surface 204 is not angled. Flat bearing 206 is attached to body 202 against surface 204 using fasteners 128. Bearing 58 rides along flat bearing 206 whereas bearing 56 rides along bearing wedge 50 similar to the previous embodiment. In this embodiment, once bearing wedge 50 is attached to body 202 via fasteners 128, ram 208 with bearings 50 and 58 are rotated until bearing 58 contacts flat bearing 206. Bearing wedge 50 is then adjusted until the play is removed from ram 208. In the illustrative embodiment, screws 213 are disposed in body 202 and act on bearing wedge 50 driving it down, creating the wedge effect until there is no play in ram 208. Through-holes 211 are slotted to accommodate the movement of bearing wedge 58. Once adjusted to the correct bearing play, fasteners 128 are tightened to lock bearing wedge 50 in place. This configuration allows covers 210 and 212 to be removed without changing the preload condition of the bearings.

In addition to the change in bearing configuration, assembly 200 also employs shock pads 28 to assist in limiting movement of ram 208 rather than stops 30 and 32. Also, actuator assembly 290 is illustratively a separate component from body 202. Actuator assembly 290 houses the actuator that includes o-ring seal 220, bushing 212, rod seal 214, stop tube 216, piston seals 98, piston 100, fastener 104, cylinder body 218, body fastener 219, retaining ring 92, plug 94, and o-ring 96.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. A pin locating assembly comprising:
    a body having a cavity located therein, wherein the cavity includes a first surface;
    a ram partially disposed in the cavity of the body and extending outward therefrom, and wherein the ram is movable with respect to the body between extended and retracted positions and wherein the ram has a longitudinal axis;
    a bearing wedge located on the first surface of the body;
    a bearing attached to the ram which engages the bearing wedge to limit rotational movement of the ram about the ram's longitudinal axis.

2. The pin locating assembly of claim 1, wherein the body further comprises a second surface that receives a second bearing wedge; and wherein a second bearing is attached to the ram and engages the second bearing wedge.

3. The pin locating assembly of claim 2, wherein the second bearing is located on an opposite side of the ram from the bearing.

4. The pin locating assembly of claim 2, wherein the second bearing is a second roller bearing.

5. The pin locating assembly of claim 1, further comprising a stop that is attached to the ram and is engageable with the body to limit the movement of the ram.

6. The pin locating assembly of claim 5, wherein at least a portion of the stop is made of a resilient material.

7. The pin locating assembly of claim 5, wherein a second stop is attached to the ram opposite the stop.

8. The pin locating assembly of claim 5, wherein the stop is adjustable relative to the ram.

9. The pin locating assembly of claim 5, wherein the stop includes a key and the ram a corresponding key slot to receive the key.

10. The pin locating assembly of claim 9, wherein the ram includes a plurality of key slots.

11. The pin locating assembly of claim 1, further comprising a weld-splatter cover positioned around a portion of the ram.

12. The pin locating assembly of claim 1, further comprising a sensor target coupled to the ram and a sensor spaced apart from the sensor target which is movable relative to the sensor.

13. The pin locating assembly of claim 1, further comprising an actuator that moves the ram.

14. The pin locating assembly of claim 1, wherein the bearing is roller bearing.

15. The pin locating assembly of claim 1, wherein a dowel extends through the ram and is attached to the bearing.

* * * * *